(12) United States Patent
Lin et al.

(10) Patent No.: US 11,542,183 B2
(45) Date of Patent: Jan. 3, 2023

(54) WATER PRODUCTION FOR COFFEE BREWING BY ELECTRODEIONIZATION

(71) Applicant: UCHICAGO ARGONNE, LLC, Chicago, IL (US)

(72) Inventors: YuPo J. Lin, Naperville, IL (US); Seth W. Snyder, Lincolnwood, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 534 days.

(21) Appl. No.: 16/697,721

(22) Filed: Nov. 27, 2019

(65) Prior Publication Data

US 2021/0155508 A1 May 27, 2021

(51) Int. Cl.
*C02F 1/469* (2006.01)
*B01D 61/50* (2006.01)
*B01D 61/48* (2006.01)

(52) U.S. Cl.
CPC ............ *C02F 1/4695* (2013.01); *B01D 61/48* (2013.01); *B01D 61/50* (2013.01); *C02F 2201/4611* (2013.01)

(58) Field of Classification Search
CPC .............................. C02F 1/4695; B01D 61/48
See application file for complete search history.

(56) References Cited

U.S. PATENT DOCUMENTS

| 6,495,014 B1 | 12/2002 | Datta et al. |
| 7,306,934 B2 | 12/2007 | Arora et al. |
| 7,452,920 B2 | 11/2008 | Lin et al. |
| 2013/0233715 A1* | 9/2013 | Lin ........................ B01D 61/48 204/632 |
| 2020/0198995 A1* | 6/2020 | Ganzi .................... C02F 1/4693 |
| 2020/0297156 A1* | 9/2020 | Bissen .................. A47J 31/605 |

OTHER PUBLICATIONS

Hendon, C.H. et al., The Role of Dissolved Cations in Coffee Extraction, Journal of Agricultural and Food Chemistry 62, 4947-4950 (2014).
Navarini, L. et al., Water Quality For Espresso Coffee, Food Chemistry 122, 424-428 (2010).

* cited by examiner

*Primary Examiner* — Salil Jain
(74) *Attorney, Agent, or Firm* — Olson & Cepuritis, Ltd.

(57) ABSTRACT

A resin-wafer electrodeionization (RW-EDI) apparatus for purifying water for coffee brewing comprises a cathode; an anode; and multiple porous solid resin wafer exchange units arranged in a stack between the cathode and the anode, and an air distributor adapted and arranged to aerate the water to be purified. Each unit comprises a monovalent cation exchange membrane (CEM), an anion exchange membrane (AEM), and an ion exchange resin wafer between the CEM and the AEM, which is in contact with, and in fluid flow connection with the CEM and AEM. Each resin wafer comprises a cation exchange resin and an anion exchange resin. The units are oriented with the CEM facing the cathode and the AEM facing the anode, with space between the units defining ion concentrate chambers. Bipolar ion exchange membranes separate the anode and cathode from their nearest resin wafer exchange units.

9 Claims, 6 Drawing Sheets

WATER PRODUCTION FOR COFFEE BREWING BY ELECTRODEIONIZATION

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to water purification using electrodeionization. More particularly, the invention relates to a resin-wafer electrodeionization (RW-EDI) method for producing water for coffee brewing.

BACKGROUND OF THE INVENTION

Water feed streams for many industrial, commercial, and consumer applications must often be pretreated to remove unwanted ionic contaminants. Typically, the pre-treatment involves use of ion-exchange resins, electrodialysis, or electrodeionization. In ion-exchange processes the ion-exchange resins are exhausted after removal of the target ions, and must be regenerated by acids, bases, or salts, thus producing a significant waste stream. Electrodialysis uses an electrically driven ion-exchange membrane comprising a stack of alternating cation, anion, or bipolar membranes. Ions are removed from a feed stream and purified and concentrated in a product or concentrate stream. Since ion transport in electrodialysis is driven by electric power, such processes do not consume equivalent quantities of acids, bases, or salts and do not produce a salt waste stream. When the ion concentration in the feed stream is low, e.g., below about 1%, electrodialysis processes become unattractive because the low ionic conductivity in the dilute feed stream leads to very low flux and high energy consumption.

Electrodeionization (EDI), also known as "electrochemical ion-exchange", at is an advanced ion-exchange technology that combines the advantages of ion-exchange and electrodialysis. In electrodeionization processes, ion-exchange resins are sequestered in dilute feed compartments to increase the ionic conductivity, so that even with an ionically dilute feed, a stable operation with higher flux and lower energy consumption than electrodialysis, becomes possible. The electric power also splits the water to $H^+$ and $OH^-$ ions and the resins are thus regenerated while the ions are removed. A preferred type of electrodeionization is referred to as resin-wafer electrodeionization (RW-EDI). In RW-EDI, the ion-exchange resins are bound together with a polymeric elastomer to form a porous wafer (see e.g., U.S. Pat. No. 6,495,014 to Datta, Lin, Burke and Tsai, which is incorporated herein by reference in its entirety).

Numerous types of water feed sources for industrial, commercial, or consumer applications require some form of purification to obtain optimum performance. Examples of such applications include boiler water, high purity water for analytical analyses, consumer drinking water, and the like. Water quality is also important for coffee brewing.

The ion profile and concentrations in the water are key factors for extracting good flavors from roasted coffee, and for control of brewing time. The balance between $CO_3^{-2}$ and $Ca^{+2}$ in the water are very important for extraction of coffee (e.g., about 120 ppm of $CaCO_3$ is considered optimal). The current standard operating protocol is to process water in the coffee shop. Reverse osmosis (RO) is frequently used for removal most of the ions in water. Then $CaCO_3$ is added into the treated water to achieve the desired ion profile (e.g., the desired concentration of $CaCO_3$). There are a number of drawbacks to using RO, however, including, e.g., severe fouling issues, a need to readjust the $CaCO_3$ concentration; the need to replace the RO membrane every 6 months and pump for 1200 hours; and the need for uniform water quality from different water sources, which can be difficult using RO. In addition, in coffee water production it is often desirable to reduce specific ions and retain others. RO is not capable of such selectivity.

There is an ongoing need for alternative methods for purifying water for coffee brewing. The methods described herein utilize RW-EDI, which can provide a "tailored" water quality, reduce sodium, chloride, and sulfate from available tap water sources, while retaining and carbonate, and suffers from significantly reduced fouling.

SUMMARY OF THE INVENTION

A resin-wafer electrodeionization (RW-EDI) apparatus for purifying water for coffee brewing is described herein. The apparatus comprises a cathode; an anode; and multiple porous solid ion exchange resin wafer exchange units arranged in a stack between the cathode and the anode, and an air distributor adapted and arranged to aerate the processed water. Each unit comprises a monovalent cation exchange membrane (CEM), an anion exchange membrane (AEM), and an ion exchange resin wafer (also referred to herein as a resin wafer chamber) between the CEM and the AEM, which is in contact with, and in fluid flow connection with the CEM and AEM. Each resin wafer comprises a cation exchange resin and an anion exchange resin. The resin wafer exchange units are oriented with the CEM facing the cathode and the AEM facing the anode, with space between the units defining ion concentrate chambers. Bipolar ion exchange membranes separate the anode and cathode from their nearest resin wafer units.

In a preferred embodiment, the RW-EDI apparatus for purifying water for coffee brewing comprises a cathode; an anode; and a plurality of porous solid ion exchange resin wafer units arranged in a stack between the cathode and the anode. Each resin wafer exchange unit comprises a monovalent-selective cation exchange membrane (CEM), an anion exchange membrane (AEM), and an ion exchange resin wafer between the CEM and the AEM, which is in contact with, and in fluid flow connection with the CEM and AEM. Each resin wafer comprises a fused porous mixture of a cation exchange resin (CER) and an anion exchange resin (AER). Each resin wafer exchange unit in the stack is oriented with the CEM facing the cathode and the AEM facing the anode, and is spaced from adjacent resin wafer exchange units to thereby define an ion concentrate chamber between the AEM of one resin wafer exchange unit and the CEM of an adjacent resin wafer exchange unit. The ion concentrate chambers are in fluid flow connection each other. The cathode is separated from its closest resin wafer exchange unit by a bipolar ion exchange membrane (BEM), and the anode is separated its closest resin wafer exchange unit by another BEM. The apparatus also includes an air distributor for aerating the water flowing through the resin wafers, or for aerating the water exiting the resin wafers.

Each resin wafer comprises (a) a water inlet at a first end thereof adapted to introduce water to be purified from a water reservoir into the resin wafer and to flow through the wafer, (b) a water outlet at an opposite end thereof to direct a flow of partially deionized water exiting the resin wafer back into the reservoir to be recirculated through the resin wafers one or more times by a pump adapted to distribute water from the water reservoir into the resin wafer, and (c), either (i) a first air inlet at the first end thereof adapted to introduce air from the air distributor into the resin wafer and to flow through the resin wafers with the water to be purified and an air outlet at the opposite end thereof to direct a flow of partially $CO_2$-depleted air exiting the resin wafer along with the exiting water flow, or (ii) a second air inlet adapted and arranged to introduce air from the air distributor into water exiting the resin wafer; wherein optionally, the water inlet can also serve as the first air inlet; and optionally, the water outlet can serve as the air outlet. The water inlets of the resin wafers are in fluid flow connection with each other, and the water outlets of the resin wafers are in fluid flow communication with each other. Additionally, the apparatus is vented to maintain air pressure within the apparatus at ambient atmospheric pressure.

In use, the reservoir is filled with the water to be purified, and the water is pumped through the resin wafers without applying an electrical potential across the anode and cathode to presaturate the resin wafers with ions in the water and to fill the ion concentrate chambers. Next, an electrical potential is applied and maintained across the anode and the cathode by a direct current power source while water is pumped from the reservoir into the resin wafers through the inlets. Water flows out of the porous resin wafers through the outlets, and back into the reservoir for recirculating through the resin wafers. At the same time, the water is continuously aerated either by dispersing air through the air distributer into the resin wafers, in parallel to inlet water, or into the water exiting from the resin wafers. This is very important process design. In the internal air flow design, the air is pumped into the resin wafers in parallel to the feed water. Physically, this can be done by two methods, either (a) inject the air flow into the water flow tubing right before the water inlet, or (b) injecting the air flow via an additional air inlet port directly into the resin wafer chamber.

In the example of internal air flow described herein, the air was introduced via additional manifold into each resin wafer parallel to the water flow into the resin wafers, and the air and water exited from the same water outlet manifold. The electrical potential creates an electric field that drives a flow of anions into the ion concentrate chambers toward the anode and drives a flow of monovalent cations into the ion concentrate chambers toward the cathode. This results in an increase in the ion concentration in water that is present in the salt concentrate chambers, and a decrease in ion concentration water flowing through the resin wafers. Due to selective removal of monovalent cations from the water in the resin wafer, calcium ions presented as $Ca(OH)_2$ are retained in the recirculating water. Carbon dioxide present in the air of the aerated water dissolves and ionizes to form $CaCO_3$ and automatically adjusts the pH of the water being recirculated through the resin wafers to a value suitable to maintain a desired calcium carbonate alkalinity in the water of the reservoir for use in coffee brewing. The recirculation is halted when the desired calcium carbonate alkalinity is achieved in the water of the reservoir.

In some embodiments, the anode and cathode both are substantially planar and have substantially the same planar dimensions; and each monovalent-selective cation exchange membrane, anion exchange membrane, and resin wafer have substantially the same planar dimensions as the cathode and the anode.

Preferably, each ion concentrate chamber is enclosed within a gasket-flow distributor that seals against adjacent resin wafer exchange units; each gasket-flow distributor comprising a porous body filling the chamber, and the inlet and outlet of the chamber.

The apparatus preferably comprises at least six resin wafer exchange units. In some embodiments, the apparatus includes at least 20, 50, or 100 units. The resin wafers of the resin wafer exchange units preferably have a thickness in the range of about 1 mm to about 20 mm. The mixture of CER and AER in each resin wafers preferably comprises a CER to AER weight ratio of about 0.5 to about 1.5.

Also described herein is a method for purifying water for coffee brewing in which RW-EDI is used to adjust calcium and carbonate levels in the water to an optimal level of flavorful coffee brewing (e.g., approximately 60 to 65 ppm calcium and 55 to 60 ppm carbonate). The method comprises first pumping water to be purified (e.g., a selected tap water source) through the resin wafers of the apparatus described herein without applying an electrical potential across the anode and the cathode in order to presaturate the resin wafers with the ions in the water and fill the ion concentrate chambers. Next water from a reservoir filled with the same water is pumped through the resin wafers through the inlets thereof while applying and maintaining an electrical potential across the anode and the cathode, such that water flows through the porous resin wafers and the outlets thereof, and back into the reservoir for recirculating through the resin wafers. At the same time, the water is continuously aerated by the air distributer either inside the resin wafer chambers or after exiting the resin wafer chambers. The water is recirculated from the reservoir through the resin wafers one or more times until the desired calcium carbonate alkalinity and a pH suitable to maintain the desired calcium carbonate alkalinity is achieved in the water of the reservoir for use in coffee brewing.

Preferably, the electric potential applied across the cathode and the anode is about 8 Volts (V) to about 35 V (e.g., about 30 V). In some embodiments, the electric potential applied across the cathode and the anode is about 11 V to about 18 V.

The desired calcium carbonate alkalinity in the water for coffee brewing is about 80 to about 250 ppm; preferably about 100 to about 170 ppm.

In some embodiments, the water from the reservoir is pumped through the resin wafers of the apparatus at a rate of about 10 to about 90 L/hr·m$^2$ (e.g., about 15 L/hr·m$^2$). Preferably, the water is aerated at an internal air flow rate of about 0.2 to about 1.2 m$^3$/hr·m$^2$ (e.g., about 0.6 m$^3$/hr·m$^2$).

The methods and apparatus described herein consist of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION

The quality of water used in coffee brewing, e.g., the salt content and pH, influences not just the taste but also the brewing time. Many coffee shops use and treat municipal tap water to meet their product specifications. Most notably coffee shops typically prefer to remove monovalent cations such as sodium and anions such as chloride and sulfate from the tap water. For taste quality, it is also desirable to retain divalent cations such as calcium and carbonate ions. To achieve the targeted water quality, the ions in the tap water are removed using water purification technology such as reverse osmosis (RO), a membrane separations process. RO rejects most salts and ions and cannot achieve the targeted composition. To achieve the targeted composition, coffee shops typically add the desired minerals back to the desalinated/deionized water. $CaCO_3$ must be purchased and added back to achieve the desired coffee flavor and brewing time control that is desired for optimal brewing. Using RO to strip all the ions and then adding back calcium carbonate increases energy use and overall costs of coffee production and decreases sustainability of coffee making.

The RW-EDI technology described herein can achieve the targeted water quality for coffee brewing directly, without removing all ions and adding back calcium carbonate. The RW-EDI methods and apparatus described herein can selectively remove undesirable ions (e.g., monovalent cations, and various inorganic anions, thus reducing costs and improving sustainability relative to current practice. The methods and apparatus described herein reduce, e.g., $Na^+$, $Cl^-$, and $SO_4^{2-}$ while retaining calcium, carbonate and bicarbonate$^-$. The monovalent-selective cation-exchange membranes of the apparatus separate most of the $Na^+$ in the water and retain $Ca^{2+}$ in the purified water. The resin wafer can also be adjusted to control the pH of purified water effluent to slightly basic (e.g., 8.5) by the ratio of cation and anion exchange resins in the resin wafer, for example. At basic pH, the $CO_2$ from air will be converted into carbonate ion and remain in solution while inorganic ions such as small anions, $Cl^-$, and multiply charged ions such as $SO_4^{2-}$ are separated from the purified water effluent.

Membrane fouling in low-pressure RW-EDI, such as in the methods an apparatus described herein is much less of a problem than high-pressure RO. Therefore, membranes are expected to have a significantly longer lifetime, reducing operating costs relative to the RO membranes or EDI.

The economics of the method, as illustrated for treating Chicago tap water using RW-EDI, are that the treatment cost is estimated to be less than $1.00 to produce 300 gals of pure water or less than 0.3 cents per gallon of water produced. RW-EDI removes more than 92% of salt contents in the tap water (see Table 1). In addition, 90% of the tap water influent was purified and collected by RW-EDI compared to only 50% of the influent water typically obtained using RO technology.

TABLE 1

| Chicago Tap water | |
|---|---|
| Feed Conductivity | 295.0 uS/cm |
| Feed out conductivity | 21 uS/cm |
| Feed in NaCl | 26.0 mg/L |
| Feed out NaCl | 2.5 mg/L |
| Feed TDS | 162.3 mg/L |
| Feed out TDS | 11.5 mg/L |
| Prouctivity | 32.5 gal/m2/h |
| Energy Consumption | 20.3 Kwh/Kgal |
| Daily process | 300 gal/day |
| Operation time | 20 hour/day |
| Electricity cost | $ 0.36 per day |
| Membrane cost | $ 0.52 per day |
| Total operation cost | $ 0.88 per day |
| | $0.0029 per gal water |

Technical Background

The general water quality for coffee brewing are to maintain around $Ca^{+2}$ approximately 63 ppm and $CO_3^{-2}$ approximately 57 ppm contents, or a total of about 120 ppm of $CaCO_3$ alkalinity, while removing most of the rest of the salt content to provide the desired degree of water purity.

To achieve these target water quality from a tap water, the electrically-driven RW-EDI separation process described herein is used to remove most of the salts in the tap, but selectively retain the $Ca^{+2}$ ion in a basic aqueous phase that will react with $CO_2$ in the air from the aerated water to deliver the $CaCO_3$ in the final processed water and automatically adjust the pH to a suitable value. Loose ion exchange resins are molded into a solid, porous, resin wafer. The resin wafer increases both ionic conductivity and porosity and performance consistency in comparison to a loose resin bed. RW-EDI improves pH control, process stream control, and ion management. To remove the mineral salts in the feed tap water in the resin wafer (also referred to as the "dilute stream" in FIG. 1), the ion resin beads serve as an ion reservoir in the dilute compartment that separately adsorbs cations and anions on the resin beads contained in the resin wafer. The ions associated with the resin wafer beads are electrically transported across the ion-exchange membranes into the "salt-concentrated stream" (i.e., water with higher ion concentration than the water in the resin wafers) in the ion-concentrate chambers.

Figure 1:
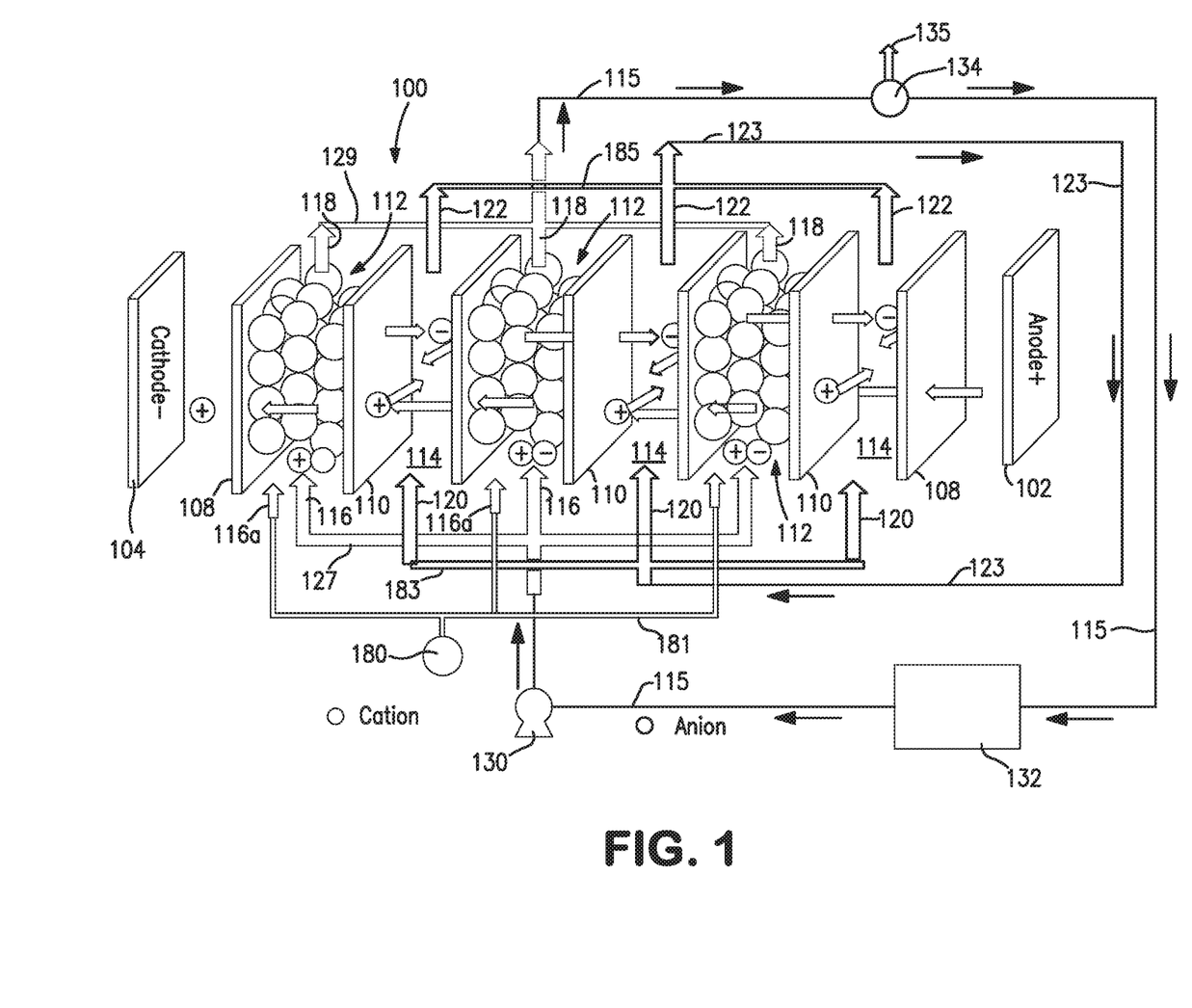
FIG. 1 provides a schematic illustration of the operation of an RW-EDI.

Selected internal components of a basic platform RW-EDI shown in FIG. 1 are exchangeable to selectively alternating the cations and anions extraction or retention once the feed water is fed into the device. Another feature of the RW-EDI operation is that different degrees of water splitting reaction as in Equation 1 (Eq. 1) below can be electrically generated to produce $H^+$ and $OH^-$ ions in the dilute compartments.

$$H_2O \leftrightarrow H^+ + OH^- \qquad \text{(Eq. 1)}$$

The multiple interactions of different ion extraction and retention rates, as well as $H^+$ and $OH^-$ ion generation rates inside the resin wafers under an applied electric field are controlled to achieve the production and retention of $CaCO_3$ in the final processed water stream for desired alkalinity water quality. As mentioned above, the alkalinity of carbonate results from the dissolution of $CO_2$ from the air into the water to be purified. Two process designs were implemented and tested to evaluate the effectiveness of in situ adjustment of the mineral contents and calcium carbonate alkalinity using RW-EDI for the desired water quality for coffee brewing. The two designs are illustrated schematically in FIG. 2 for a system with one resin wafer cell, which is defined by a resin wafer exchange unit and an adjacent ion concentrate chamber. The designs include dispersion of air into the resin wafers to aerate the water that is being pumped inside the resin wafers (FIG. 2, left panel; also referred to herein as "internal air-flow"), and dispersion of air into the water that is exiting the resin wafers (FIG. 2, left panel; also referred to herein as "external air-flow").

The pH of the feed water to be purified inside the RW-EDI resin wafers can be controlled to be basic by the combination of selected ratios of the cation and anion exchange resins in the resin wafers, water feed flow rate, types of cationic and anionic membranes used in the RW-EDI, and the applied electric fields, e.g., applied voltages or currents. Thus, $Ca(OH)_2$ generated inside the RW-EDI can dissolve and capture the $CO_2$ from the air that is dispersed in the water, which is converted into $CaCO_3$. During the operation, other salts, such as $Na^+$, $Cl^-$, $SO_4^{2-}$, are preferentially removed relative to the $Ca^{+2}$ ions. Depending on the required alkalinity of the final water quality, the $Ca^{+2}$ ion concentration initially in the feed tap water may not be enough to reach the final concentration of the desired calcium carbonate alkalinity in the water. In such cases, $Ca^{+2}$ ion can be concentrated and retained inside the RW-EDI resin wafers by pumping the raw tap water through the resin wafer compartments without applying the electric field. When no applied electric field is present, the $Ca^{+2}$ ions are adsorbed by the resin wafer and concentrated on the cation-exchange resin beads of the resin wafer. Thereafter, the concentrated/adsorbed $Ca^{+2}$ ion on the resin beads can be released into the processed tap water during the operation of RW-EDI with an applied electric field.

As described herein, a preferred resin-wafer electrodeionization (RW-EDI) apparatus for purifying water for coffee brewing comprises:

a cathode;
an anode;
a plurality of porous solid resin wafer exchange units arranged in a stack between the cathode and the anode, each resin wafer exchange unit comprising a monovalent-selective cation exchange membrane, an anion exchange membrane, and an ion exchange resin wafer there between, in contact with, and in fluid flow connection with the cation exchange membrane and the anion exchange membrane;

each resin wafer comprises a fused porous mixture of a cation exchange resin (CER) and an anion exchange resin (AER);

each resin wafer exchange unit in the stack is oriented with the cation exchange membrane facing the cathode and the anion exchange membrane facing the anode;

each resin wafer exchange unit in the stack is spaced from an adjacent resin wafer exchange unit to thereby define an ion concentrate chamber between the anion exchange membrane of one resin wafer exchange unit and the cation exchange membrane of the adjacent resin wafer exchange unit; and the ion concentrate chambers are in fluid flow connection each other;

the cathode is separated from the resin wafer exchange unit adjacent to the cathode by a first bipolar ion exchange membrane, and the anode is separated from the resin wafer exchange unit adjacent to the anode by a second bipolar ion exchange membrane;

an air distributor adapted and arranged to aerate the water flowing inside the resin wafers, or to aerate the water exiting the resin wafers;

each resin wafer comprises (a) a water inlet at a first end thereof adapted to introduce water to be purified from a water reservoir into the resin wafer and to flow through the wafer, (b) a water outlet at an opposite end thereof to direct a flow of partially deionized water exiting the resin wafer back into the reservoir to be recirculated through the resin wafers one or more times by a pump adapted to distribute water from the water reservoir into the resin wafer, and (c), either (i) a first air inlet at the first end thereof adapted to introduce air from the air distributor into the resin wafer and to flow through the resin wafers with the water to be purified and an air outlet at the opposite end thereof to direct a flow of partially $CO_2$-depleted air exiting the resin wafer along with the exiting water flow, or (ii) a second air inlet adapted and arranged to introduce air from the air distributor into water exiting the resin wafer; wherein optionally, the water inlet can also serve as the first air inlet; and optionally, the water outlet can serve as the air outlet;

the water inlets of the resin wafers are in fluid flow connection with each other (e.g., by a manifold) and the water outlets of the resin wafers are in fluid flow communication with each other; the apparatus is vented to maintain air pressure within the apparatus at ambient atmospheric pressure; and wherein, when in use, water to be purified is pumped through the resin wafers to presaturate the wafers with the water to be purified and to fill the ion concentrate chambers; and the reservoir is filled with the same water to be purified; next, an electrical potential is applied across the anode and the cathode by a direct current power source and water is pumped from the reservoir into the resin wafers through the inlets; water flows out of the porous resin wafers through the outlets, and back into the reservoir for recirculation through the resin wafers; at the same time, the water flowing through the resin wafers from the reservoir is aerated by the air distributer either inside the resin wafer chambers or after the water exits the resin wafers; the electrical potential creates an electric field that drives a flow of anions into the ion concentrate chambers toward the anode and drives a flow of monovalent cations into the ion concentrate chambers toward the cathode; consequently, an ion concentration increases in water that is present in the ion concentrate chambers, and water flowing through the resin wafers is partially deionized, and retains calcium and carbonate ions; and carbon dioxide present in the air of the aerated water dissolves and ionizes to automatically adjust the pH of the water being recirculated through the resin wafers to a value suitable to maintain the desired calcium carbonate alkalinity in the water of the reservoir for use in coffee brewing; and recirculation of the water is halted when the desired calcium carbonate alkalinity is achieved in the water of the reservoir.

In another aspect, a method of purifying water for coffee brewing is described, which comprises:

filling the reservoir of the apparatus described herein with the water to be purified;

pumping water to be purified through the resin wafers without applying an electric potential across the anode and the cathode to presaturate the resin wafers with ions in the water and to fill the ion concentrate chambers;

applying and maintaining an electrical potential across the anode and the cathode by a direct current power source while pumping water from the reservoir into the resin wafers through the inlets thereof, such that water flows through the porous resin wafers and the outlets thereof, and back into the reservoir, and while continuously aerating the water with the air distributer either inside the resin wafer chambers or after the water exits the outlets; and recirculating the so aerated water from the reservoir through the resin wafers one or more times while still applying and maintaining the electrical potential across the anode and the cathode until the desired calcium carbonate alkalinity and the pH suitable to maintain the desired calcium carbonate concentration is achieved in the water of the reservoir for use in coffee brewing.

FIG. 1 schematically illustrates operation of an embodiment of a RW-EDI apparatus with three resin wafer cells. Apparatus 100 comprises anode 102, cathode 104 and three resin wafer exchange units arranged in a stack between anode (positive electrode) 102 and cathode (negative electrode) 104. Each resin wafer exchange unit comprises a monovalent cation exchange membrane (CEM) 108 and an anion exchange membrane (AEM) 110 with a resin wafer 112 between and contacting CEM 108 and AEM 110. The resin wafer exchange units are arranged and oriented such that the CEM 108 of each unit faces the direction of cathode 104 and the AEM 110 of each unit faces the direction of anode 102, with a space between each unit defining an ion concentrate chamber 114. Resin wafer cells are defined by a single resin wafer exchange unit and an adjacent ion concentrate chamber 114.

Each resin wafer 112 includes an inlet 116 at one end thereof for directing water to be purified into the resin wafer and an outlet 118 for directing water out of the resin wafer. In one configuration, each resin wafer 112 includes an inlet 116a at one end thereof for directing air flow into the resin wafer to aerate the water inside resin wafer, and the air exits each resin wafer through outlet 118 along with the water. Inlets 116a are connect via air manifold 181, which is fed with air by air disperser 180. Inlets 116 are connected by manifold 127, which is fed with water to be purified by dilute stream 115 from reservoir 132. A partially $CO_2$-depleted air stream 135 is vented from dilute stream 115 by air-water separator 134. Outlets 118 are connected by manifold 129, which is adapted and arranged to direct dilute stream 115 exiting from the resin wafers back into reservoir 132 for recirculation back through the resin wafers by pump 130. Each ion concentrate chamber 114 includes an inlet 120 at one end thereof and an outlet 122 at the opposite end thereof. The inlets 120 are in fluid flow connection with each other via manifold 183, and the outlets 122 are in fluid flow connection with each other via manifold 185. Inlets 120 and outlets 122 are adapted and arrange so that a salt concentrate stream 123 recirculates back through the ion concentrate chambers 114. Alternatively, the water to be purified can be aerated after exiting the resin wafers 112, e.g., as described with respect to FIG. 2, right panel.

When an electric field is applied between anode 102 and cathode 104 carbon dioxide in the air is dissolved and ionized in the dilute stream 115, monovalent cations preferentially migrate into an adjacent ion concentrate chamber 114 in the direction of the cathode, and anions migrate into an adjacent ion concentrate chamber 114 in the direction of the anode to form the salt concentrated stream 123. At the same time, calcium ions are retained within the resin wafers 112 and dilute stream 115 to ultimately reach a desired calcium carbonate alkalinity in the water of the reservoir, at which time recirculation of the water is ceased. The directions of air and water flows in FIG. 1 are indicated by the directions of arrowheads throughout the figure.

Figure 2:
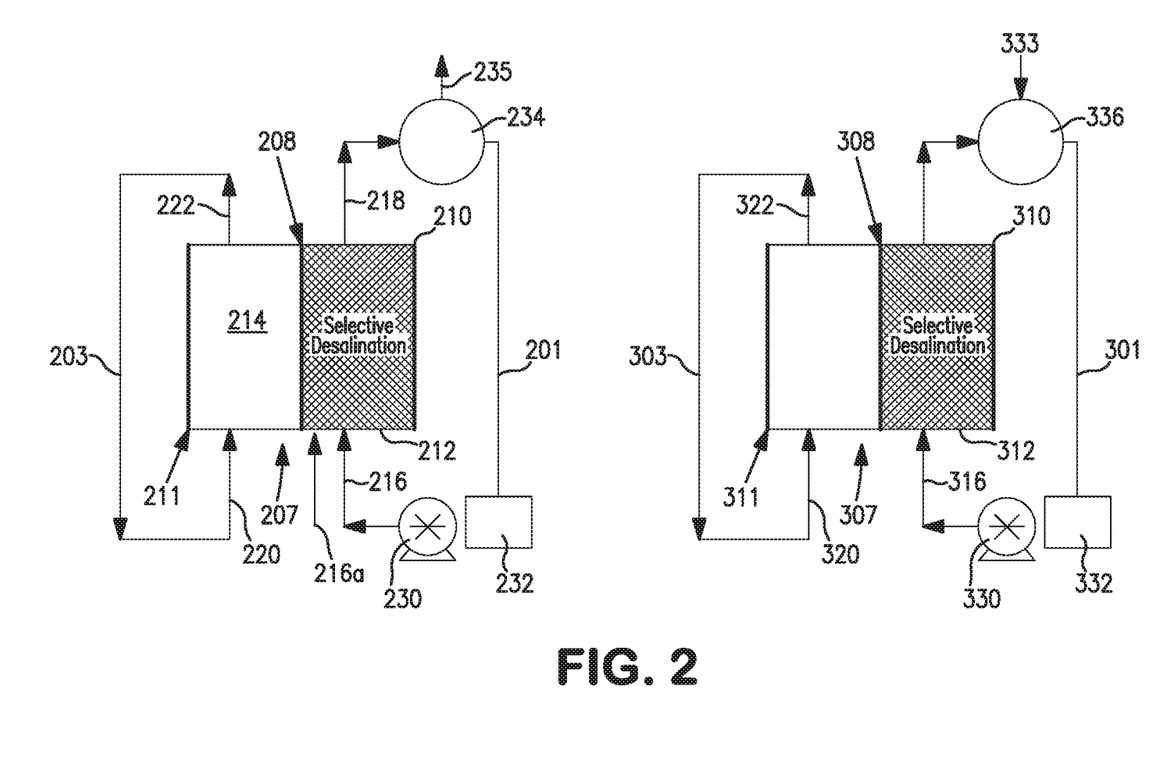
FIG. 2 provides schematic illustrations of two alternative cell arrangements for RW-EDI differing in the manner and place where air is introduced in the water.

FIG. 2 schematically illustrates two alternative configurations for aeration the water to be purified. The left panel of FIG. 2 illustrates a design in which air is dispersed into the water to be purified before entering the resin wafer. Cell 207 includes a monovalent cation exchange membrane (CEM) 208 and an anion exchange membrane (AEM) 210 with a resin wafer 212 between and contacting CEM 208 and AEM 210, and an ion concentrate chamber 214 defined by the space between CEM 208 and a second AEM 211. Air is dispersed via inlet 216a into the water inside the resin wafer chambers 212 that is to be purified. In use, water to be purified is pumped by pump 230 from reservoir 232, through inlet 216, wafer 212, outlet 218, air-water separator 234, and back into reservoir 232 continuously until the desired water quality is achieved. Partially deionized dilute stream 201 exits resin wafer 212 through outlet 218 and air 235 is vented from dilute stream 201 by air-water separator 234 before dilute stream 201 returns back into reservoir 232 for recirculation. Similarly, a salt concentrated water stream 203 circulates in a loop from inlet 220, through chamber 214, out of outlet 222, and back through inlet 220. The flows of streams 201 and 203 are in the direction of the corresponding arrows.

The right panel of FIG. 2 illustrates a design in which air is dispersed into the water to be purified after exiting the resin wafer. Cell 307 includes a monovalent cation exchange membrane (CEM) 308 and an anion exchange membrane (AEM) 310 with a resin wafer 312 between and contacting CEM 308 and AEM 310, and an ion concentrate chamber 314 defined by the space between CEM 308 and a second AEM 311. Partially deionized water dilute stream 301 exits resin wafer 312, and air stream 333 is dispersed into dilute stream 301 by air disperser 336 before dilute stream 301 returns into reservoir 332 for recirculation. In use, water to be purified is pumped by pump 330 from reservoir 332, through inlet 316, wafer 312, outlet 318, air distributor 336, and back into reservoir 332 continuously until the desired water quality is achieved. Similarly, salt concentrated water stream 303 circulates in a loop from inlet 320 through chamber 314, out of outlet 322 and back through inlet 320. The flows of streams 301 and 303 are in the direction of the corresponding arrows.

Figure 3:
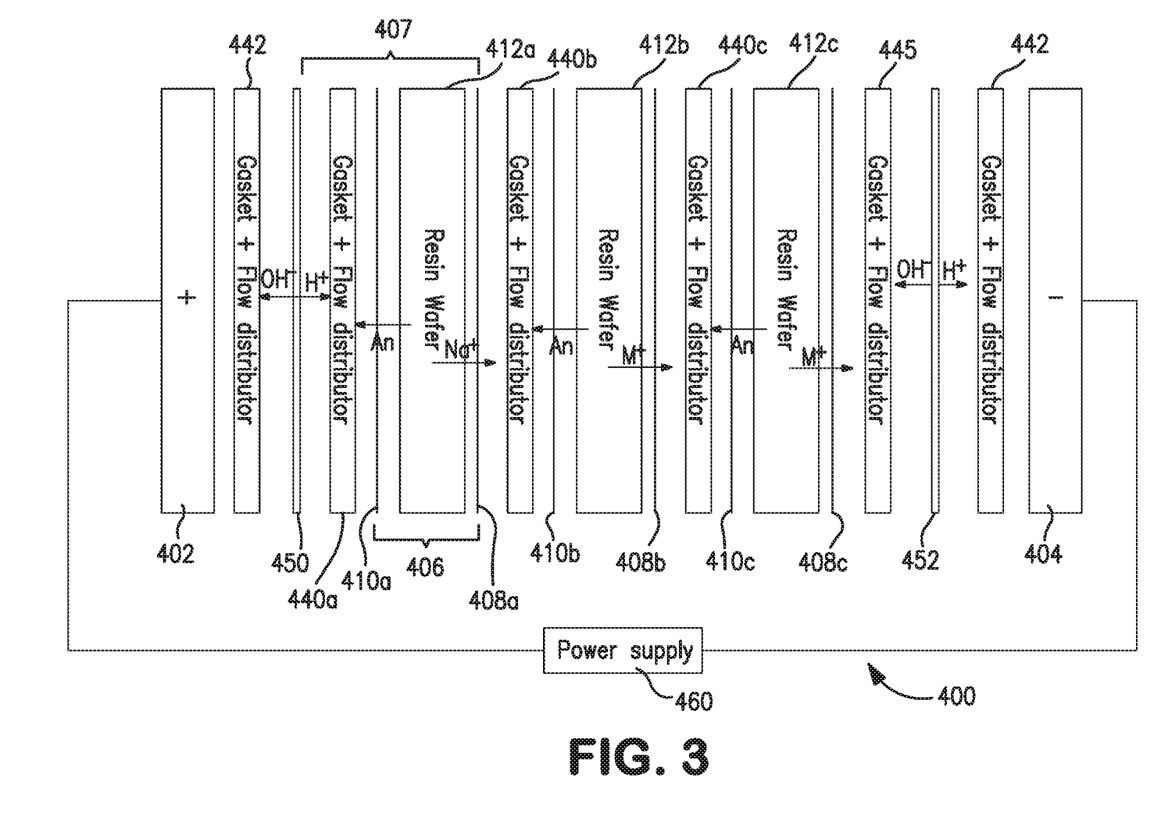
FIG. 3 provides a schematic illustration of a portion of an RW-EDI apparatus illustrating the arrangements of the cell components.

FIG. 3 schematically illustrates an exploded view of a portion of an embodiment of a RW-EDI apparatus with three resin wafer cells 407. Apparatus 400 comprises anode 402, cathode 404 and three resin wafer exchange units 406 arranged in a stack between anode (positive electrode) 402 and cathode (negative electrode) 404. Anode 402 and cathode 404 are electrically connected to power source 460. Each resin wafer exchange unit comprises a monovalent cation exchange membrane (CEM) 408a,408b,408c and an anion exchange membrane (AEM) 410a,410b,410c with a resin wafer 412a,412b,412c between and contacting their respective CEM and AEM. The resin wafer exchange units are arranged and oriented such that the CEM 408a,408b, 408c of each unit faces the direction of cathode 404 and the AEM 410a,410b,410c of each unit faces the direction of anode 402, with a gasket-flow distributor 440a,440b,440c enclosing and defining an ion concentrate chamber for collecting salt-concentrated water during operation. Each cell 407 is composed of a resin wafer exchange units 406 and an adjacent ion concentrate chamber 414a,412b,414c. The gasket-flow distributor 440a is separated from anode 402 by a bipolar membrane 450 adjacent gasket-flow distributor 440a, and a gasket-flow distributor 442 between anode 402 and the bipolar membrane 450. Similarly, cathode 404 is separated from gasket-flow distributor 445, which defines an additional ion concentrate chamber, by bipolar membrane 452 adjacent gasket-flow distributor 445, and a gasket-flow distributor 444 between cathode 404 and bipolar membrane 452.

Figure 4:
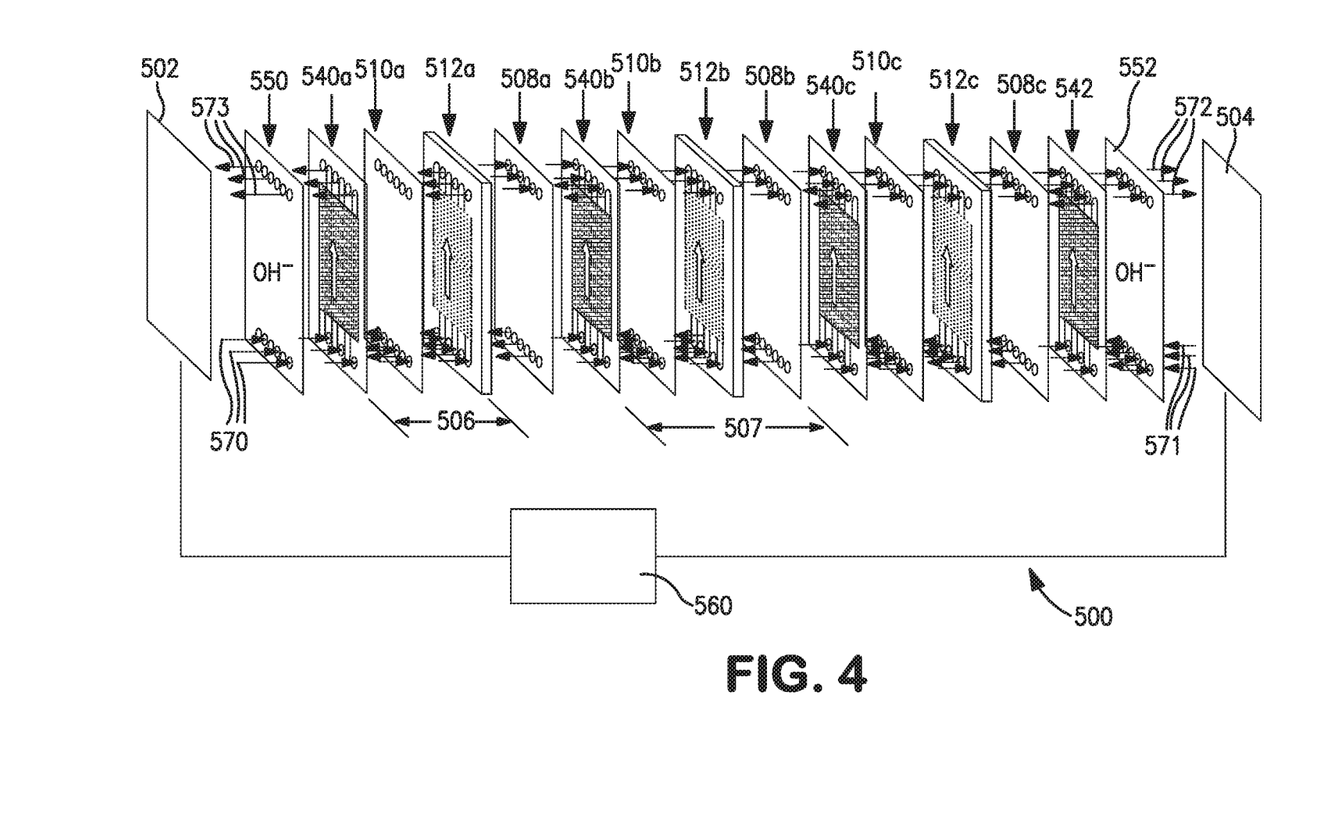
FIG. 4 provides a schematic illustration of a preferred RW-EDI apparatus in exploded perspective view.

FIG. 4 schematically illustrates an exploded view of an embodiment of a RW-EDI array with three resin wafer cells 507. Array 500 comprises anode 502, cathode 504 and three resin wafer cells 507 stacked between anode 502 and cathode 504. Each cell 507 comprises a resin wafer exchange unit 506 and an adjacent ion concentrate chamber. Anode 502 and cathode 504 are electrically connected to power source 560. Each resin wafer exchange unit 506 comprises a monovalent cation exchange membrane (CEM) 508a,508b,508c and an anion exchange membrane (AEM) 510a,510b,510c with a resin wafer 512a,512b,512c between and contacting their respective CEM and AEM. The resin wafer exchange units are arranged and oriented such that the CEM 508a,508b,508c of each unit faces the direction of cathode 504 and the AEM 510a,510b,510c of each unit faces the direction of anode 502, with a gasket-flow distributor 540a,540b,540c enclosing and defining the ion concentrate chambers for collecting salt-concentrated water during operation.

Bipolar membrane 550 is disposed between gasket-flow distributor 540a and anode 502 to isolate the anode from the cell stack. Similarly, cathode 504 is isolated from CEM 508c by an additional gasket-flow distributor 542 and bipolar membrane 552 between gasket-flow distributor 542 and cathode 504. Arrows 570 indicate passages where the water to be purified is pumped into the stack of resin wafer cells from the reservoir (not shown) for distribution to the inlets of the resin wafers 512a,512b,512c. Arrows 572 indicate the passages where a partially deionized dilute water stream exits the stack of resin wafer cells; and arrows 573 indicate passages where the salt-concentrated water stream exits the stack of resin wafer cells to be recycled back to the passages indicated by arrows 571. Additional arrows between the other components of the array indicate the directions of flow of the dilute and salt concentrated water streams.

Figure 4B:
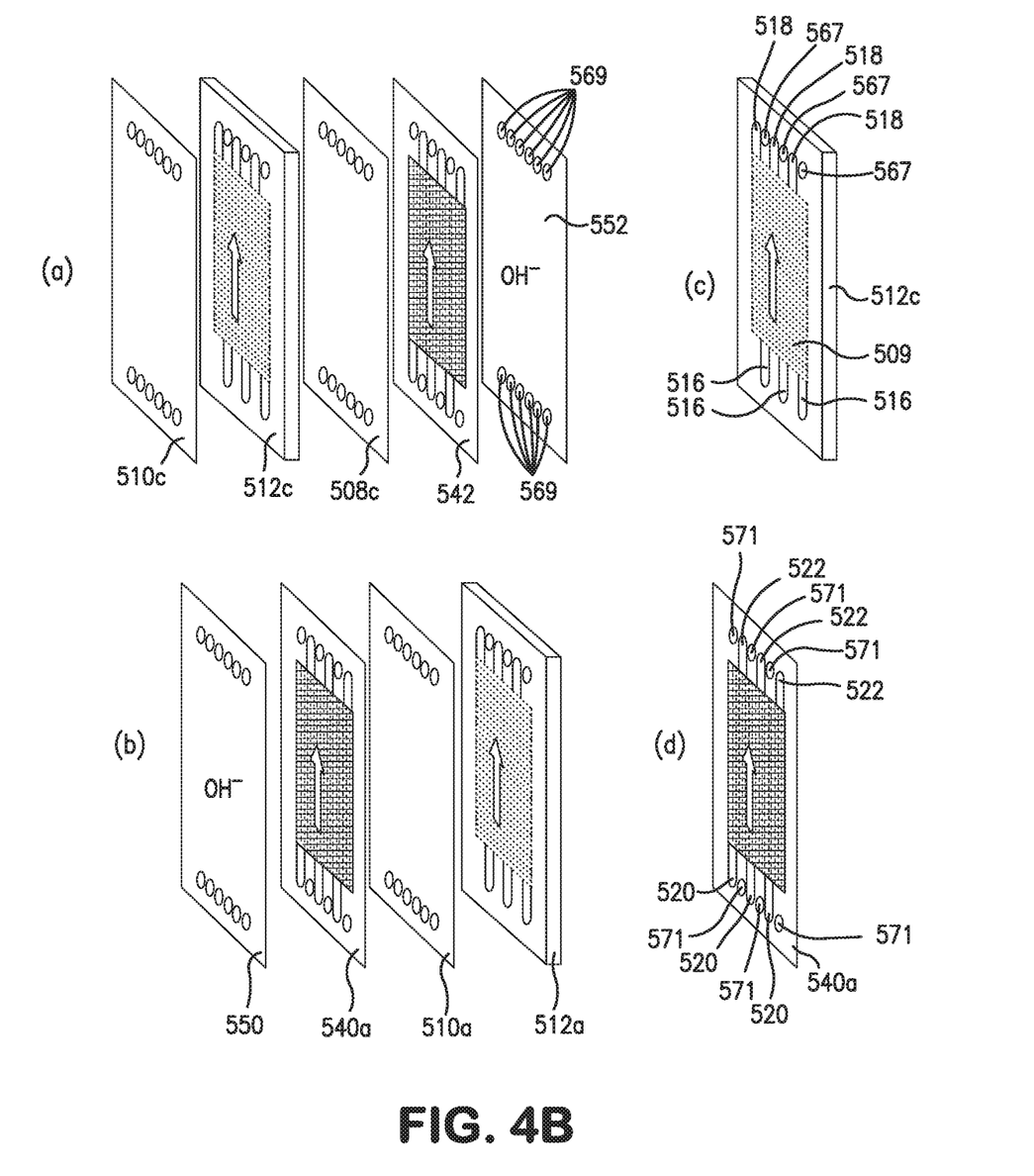
FIG. 4B provides a schematic illustration of expanded portions of the RW-EDI apparatus of FIG. 4, including (a) the left hand portion of FIG. 4, (b) the right hand portion of FIG. 4, (c) a representative resin wafer, and (d) a representative gasket-flow distributor.

FIG. 4B shows expanded portions of FIG. 4, including (a) the left hand portion of FIG. 4, (b) the right hand portion of FIG. 4, (c) a representative resin wafer 512c, and (d) a representative gasket-flow distributor 540a. In FIG. 4 and FIG. 4B, the resin wafers (e.g., 512a and 512c in FIG. 4B) each include inlets 516, a porous body 509, and outlets 518, as well as perforations 567 which are aligned with correspondingly located perforations 569 in the ion exchange membranes (i.e., in membranes 552, 508a,508b,508c, 510a, 510b,510c, and 550 in FIG. 4 and FIG. 4B. The gasket-flow distributors 540a,540b,540c,541 each include inlets 520, a porous body 543, and outlets 522. Perforations 571 in the gasket-flow distributors (e.g., 540a in FIG. 4B) are aligned with corresponding perforations 569, as well as perforations 567, so that the dilute streams can flow through the stack and the salt concentrated stream fan flow through the stack through flow passageways formed by the aligned perforations when in use.

Porous solid resin wafer ion exchange materials suitable for use in the present invention can be prepared in any suitable manner known in the art, such as for example the materials and methods described in U.S. Pat. No. 6,495,014 (Datta et al., incorporated herein by reference in its entirety), U.S. Pat. No. 7,452,920 (Lin et al., incorporated herein by reference in its entirety), and U.S. Pat. No. 7,306,934 (Arora et al.).

Experimental Methods and Apparatus
Apparatus and Materials

An RW-EDI apparatus like that of FIG. 4, but with six resin wafer cells, was used to purify Chicago tap water for coffee brewing. A titanium-based Dimensionally stable Anode (DSA) and a stainless steel (SS) cathode were used to generate the electric field crossing all the compartments of the RW-EDI apparatus. Total 6 pairs of cells were assembled in each experiment, using cation-exchange membranes of CMX, anion-exchange membranes of AMX, and bipolar membrane of B1 (all from Ameridia Solution, Inc.). The resin wafers used contained mixture of cation-exchange resin beads of PFC100E and anion-exchange resin bead of PFA444 (from Purolite). The CER and AER mixing ratios in the resin wafers were in the range of 0.5-1.5 of cation/anion-exchange capacities. A TS-2 stack from Ameridia was used to assemble the RW-EDI device. Schematic flow inside the TS-2 stack is shown in FIG. 4, discussed above.

The RW-EDI cells had a 195 $cm^2$ cross-section of active membrane area. Bipolar membranes were used at both ends of the stack to prevent the electrode rinse solution (2.5% $Na_2SO_4$) from entering the dilute or concentrate compartments. Anion and cation exchange membranes were arranged such that they were alternating placed in each side of the resin wafers (to form the dilute compartment) with a flow distributor (to form a concentrate compartment). The electric field was applied perpendicularly to the membrane surface by a DC power source (XHR 100-10, Sorensen, AMETEK, Inc., USA) to apply constant voltage or current across the electrodes.

Analytical Methods

The conductivity and pH of water samples were measured with a conductivity meter (SEVENGO Conductivity Meter, Mettler Toledo) and pH meter (ACCUMET AP62, Fisher Scientific). Anions were analyzed by ion chromatograph (METROHM 882 Compact IC PLUS System with a METROSEP A SUPP 5 column). A flow rate of 1 mL/min with a mobile phase of 4.2 mM carbonate and 100 mM sulfuric acid as the suppressor liquid was used. Cations were analyzed by ion chromatograph (WATERS 432 conductivity with IC-PAK CATION M/D column).

Operation Conditions and Procedure

Chicago tap water was used in the feed the dilute stream with a flow rate of 15 L/hr·$m^2$. The concentrate stream flow was operated at 30 L/hr·$m^2$. A constant voltage of 30 volts was applied during RW-EDI. Internal air flow rate was controlled at approximately 0.6 $m^3$/hr·$m^2$. In each experiment, tap water feed conductivity was measured first before the operation. Three times the volume of tap water needed for the target volume of processed water was circulated through the apparatus before the application of the electric field to saturate the resin wafers. To assess the operation time, a scoping experiment was run. During the scoping operations an initial voltage (e.g., 30 V) and water flow rate (e.g., 15 L/hr·$m^2$) is utilized, and the pH and conductivity of collected water effluent samples are measured and recorded. The pH and conductivity of each water effluent are correlated with the measured $CaCO_3$ content to assess the performance profile of each operation and determine the operation duration time for desired $CaCO_3$ content.

Results and Discussions

Figure 5:
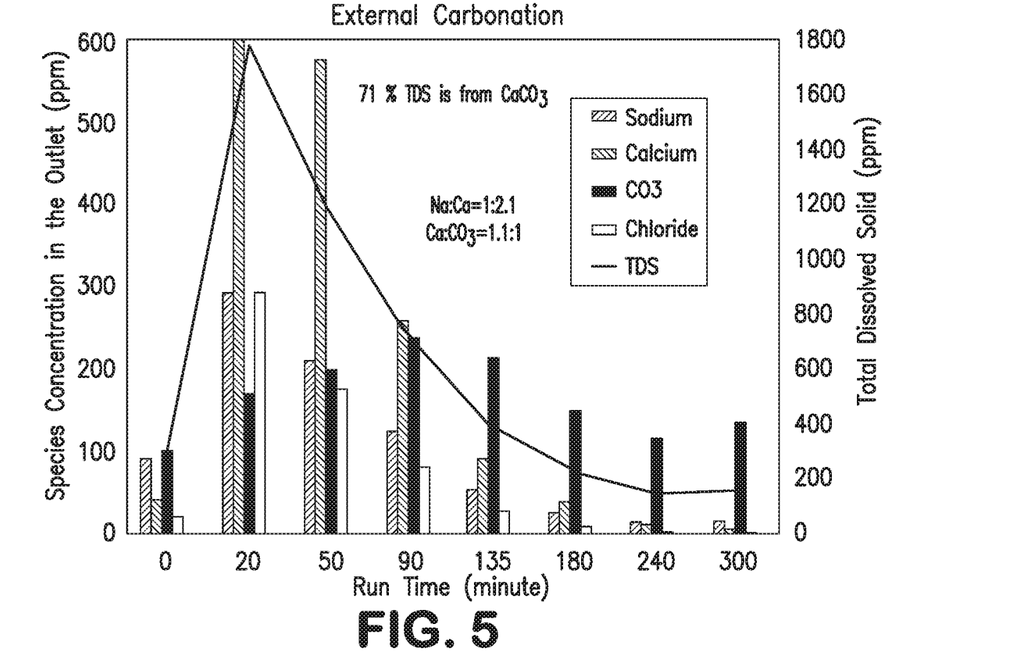
FIG. 5 graphically illustrates the changes in ion content and TDS obtained for purifying Chicago tap water with an RW-EDI similar to the one shown in FIG. 4, but utilizing a total of 6 cells instead of 3 cells, and introducing air in the water inside the resin wafer chambers.
Figure 6:
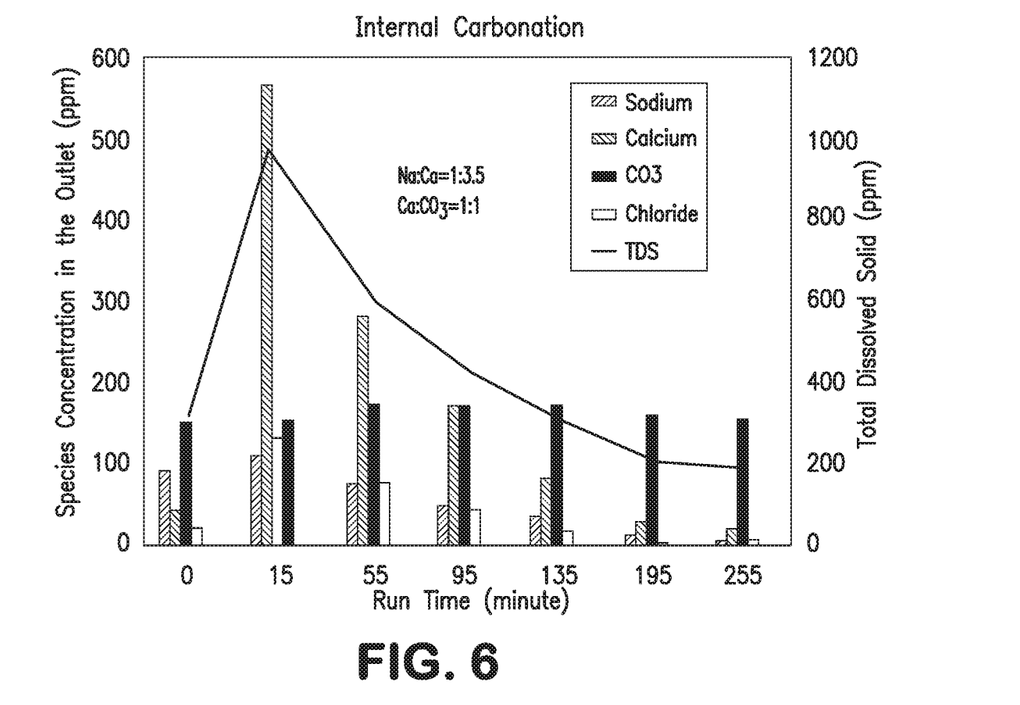
FIG. 6 graphically illustrates the changes in ion content and TDS obtained for purifying Chicago tap water with an RW-EDI similar to the one shown in FIG. 4, but utilizing a total of 6 cells instead of 3 cells, and introducing air in the water after the water flows out of the resin wafers.

FIG. 5 and FIG. 6 show two examples of experimental performance profiles of internal (FIG. 5) and external (FIG. 6) airflow integrated RW-EDI operations, e.g., as discussed in relation to the two designs of FIG. 2.

The results show the ion distribution in the treated water surprisingly can be adjusted by the integrated air/RW-EDI system. Two important results discussed below demonstrate the tunable ion distribution profile and the control of alkalinity by RW-EDI.

1. The preferential removal of other salts and retention of Ca salts. Before treated, there was more than 2 times of sodium ion compared to calcium ion in the tap water (see time 0 in FIG. 5). RW-EDI operation changed the ion distribution profile so that calcium content was more than 1.5 times of sodium (see 180 operation time in FIG. 5).
2. Alkalinity, i.e., carbonate content percentage, was surprisingly changed by the aeration of the water in the system from 60% at the start of the process to >89% of total dissolved solid (TDS).

Results from the internal airflow integrated RW-EDI system also showed similar trend as demonstration in FIG. 6. The initial content of sodium was double the calcium content, whereas at the end of the operation the calcium content was twice the sodium content. The alkalinity content percentage of TDS was increased from 60% to >93%.

In summary, the integrated airflow and RW-EDI system surprisingly can selectively alter the content of calcium carbonate in the tap water without the need of adding mineral salts and simultaneously removes the monovalent cations and anions from the tap water. The experimental results show in situ manipulation of the monovalent and divalent ion content profile and the capability to adjust the concentration of calcium.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A resin-wafer electrodeionization (RW-EDI) apparatus for purifying water for coffee brewing, the apparatus comprising:
    a cathode;
    an anode;
    a plurality of porous solid resin wafer exchange units arranged in a stack between the cathode and the anode, each unit comprising a monovalent-selective cation exchange membrane, an anion exchange membrane, and an ion exchange resin wafer between the cation-exchange membrane and the anion-exchange membrane, the resin wafer being in contact with the cation exchange membrane and the anion exchange membrane; and
    an air distributor adapted and arranged to aerate water flowing inside the resin wafers during use, or to aerate water flowing out of the resin wafers during use;
    wherein:
    each resin wafer comprises a fused porous mixture of a cation exchange resin (CER) and an anion exchange resin (AER);
    each resin wafer exchange unit in the stack is oriented such that the cation exchange membrane faces the cathode and the anion exchange membrane faces the anode;
    each resin wafer exchange unit in the stack is spaced from an adjacent resin wafer exchange unit to thereby defining an ion concentrate chamber between the anion exchange membrane of one resin wafer exchange unit and the cation exchange membrane of the adjacent resin wafer exchange unit; and the ion concentrate chambers are in fluid flow connection with each other;
    the cathode is separated from the resin wafer exchange unit adjacent to the cathode by a first bipolar ion exchange membrane, and the anode is separated from the resin wafer exchange unit adjacent to the anode by a second bipolar ion exchange membrane;
    each resin wafer comprises (a) a water inlet at a first end thereof adapted to introduce water to be purified from a water reservoir into the resin wafer and to flow through the wafer, (b) a water outlet at an opposite end thereof to direct a flow of partially deionized water out of the resin wafer and back into the reservoir to be recirculated through the resin wafers one or more times by a pump adapted to distribute water from the water reservoir into the resin wafers, and (c), either (i) a first air inlet at the first end of the resin wafer adapted to introduce air from the air distributor into the resin wafer and to flow through the resin wafer with the water to be purified, and an air outlet at the opposite end of the resin wafer to direct a flow of partially $CO_2$-depleted air out of the resin wafer along with the flow of partially deionized water, or (ii) a second air inlet adapted and arranged to introduce air from the air distributor into the partially deionized water flowing out of the resin wafer; wherein optionally, the water inlet also serves as the first air inlet; and optionally, the water outlet also serves as the air outlet;
    the water inlets of the resin wafers are in fluid flow connection with each other, and the water outlets of the resin wafers are in fluid flow communication with each other;

the apparatus is vented to maintain air pressure within the apparatus at ambient atmospheric pressure; and wherein, when in use, water to be purified is pumped through the resin wafers to presaturate the wafers with the water to be purified and to fill the ion concentrate chambers; and the reservoir is filled with the same water to be purified; next, an electrical potential is applied across the anode and the cathode by a direct current power source and water is pumped from the reservoir into the resin wafers through the water inlets; water flows out of the porous resin wafers through the water outlets, and back into the reservoir for recirculation through the resin wafers; at the same time, the water flowing through the resin wafers from the reservoir is aerated by the air distributor either inside the resin wafers or after the water exits the resin wafers; the electrical potential creates an electric field that drives a flow of anions into the ion concentrate chambers toward the anode and drives a flow of monovalent cations into the ion concentrate chambers toward the cathode; consequently, an ion concentration increases in water that is present in the ion concentrate chambers, and water flowing through the resin wafers is partially deionized, and retains calcium and carbonate ions; and carbon dioxide present in the air of the aerated water dissolves and ionizes to automatically adjust the pH of the water being recirculated through the resin wafers to a value suitable to maintain a desired calcium carbonate alkalinity in the water present in the reservoir for use in coffee brewing; and recirculation of the water is halted when the desired calcium carbonate alkalinity is achieved in the water present in the reservoir.

2. The apparatus of claim 1, wherein the anode and cathode both are substantially planar and have substantially the same planar dimensions; and each monovalent cation exchange membrane, anion exchange membrane, and resin wafer have substantially the same planar dimensions as the cathode and the anode.

3. The apparatus of claim 1, wherein each ion concentrate chamber is enclosed within a gasket-flow distributor that seals against adjacent resin wafer exchange units; each gasket-flow distributor comprising a porous body filling the chamber, and the inlet and outlet of the chamber.

4. The apparatus of claim 1, wherein the plurality of resin wafer exchange units comprises at least six units.

5. The apparatus of claim 1, wherein the plurality of resin wafer exchange units comprises at least 20 units.

6. The apparatus of claim 1, wherein the plurality of resin wafer exchange units comprises at least 50 units.

7. The apparatus of claim 1, wherein the plurality of resin wafer exchange units comprises at least 100 units.

8. The apparatus of claim 1, wherein each resin wafer has a thickness in the range of about 1 mm to about 20 mm.

9. The apparatus of claim 1, wherein the mixture of the CER and the AER in each resin wafer comprises a CER to AER weight ratio of about 0.5 to 1.5.

* * * * *